Nov. 29, 1932.  B. G. GOBLE  1,889,243
SELF LUBRICATING VERTICAL BEARING WITH SETTLING BASIN
Filed Dec. 15, 1928  4 Sheets-Sheet 1
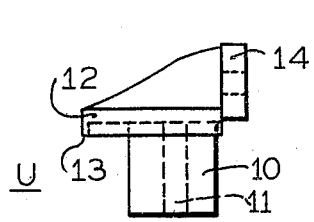
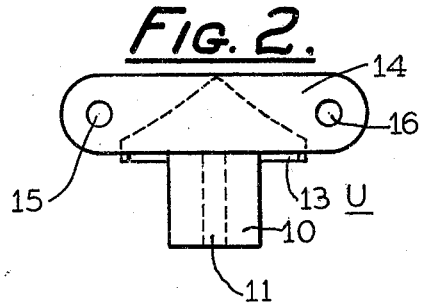
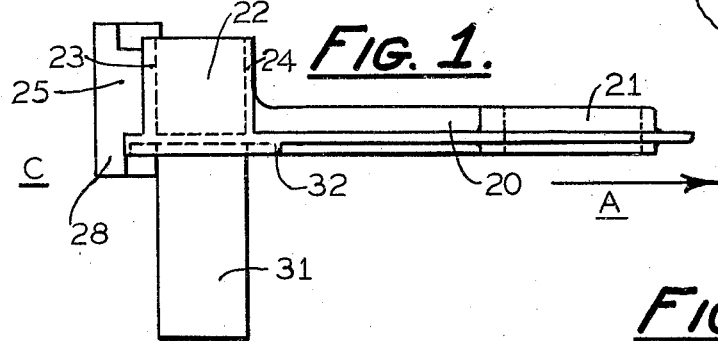
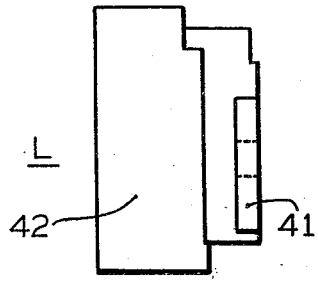
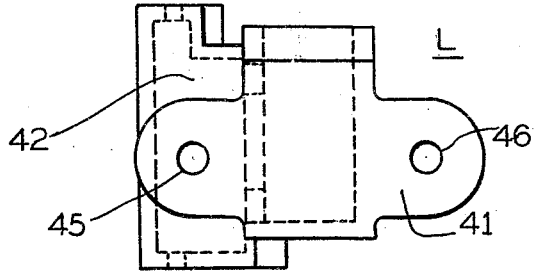
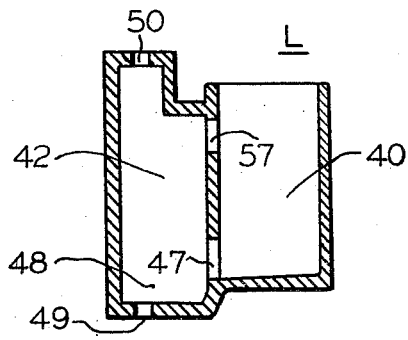
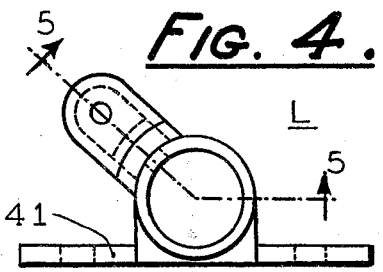
Inventor
BERT G. GOBLE.
By Tom G. Boman, Attorney

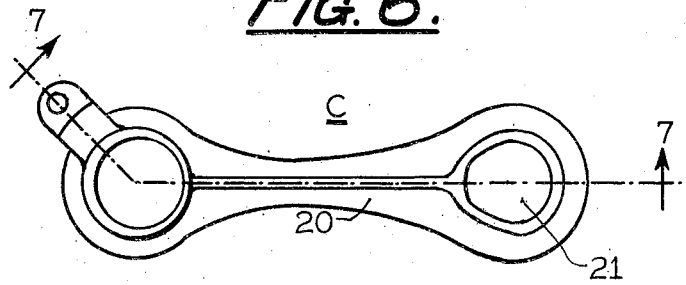
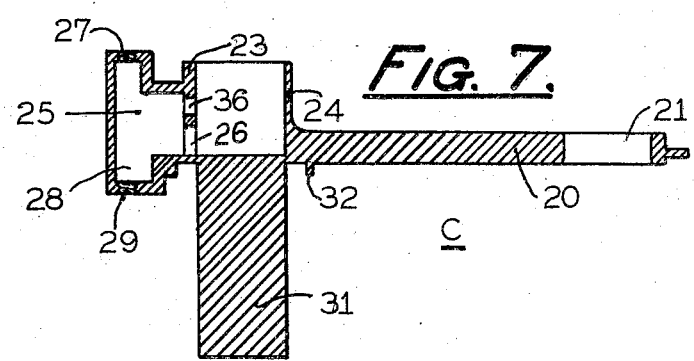
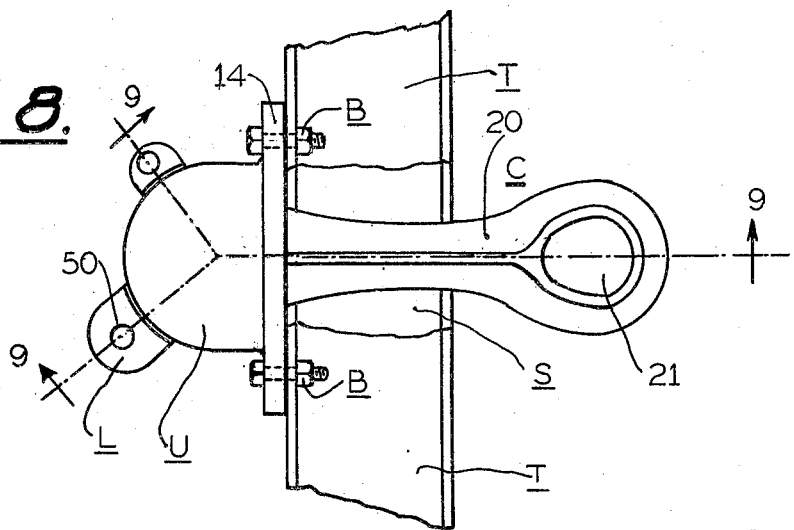

Nov. 29, 1932. B. G. GOBLE 1,889,243
SELF LUBRICATING VERTICAL BEARING WITH SETTLING BASIN
Filed Dec. 15, 1928 4 Sheets-Sheet 3
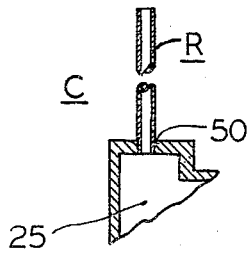
FIG. 9. FIG. 12.
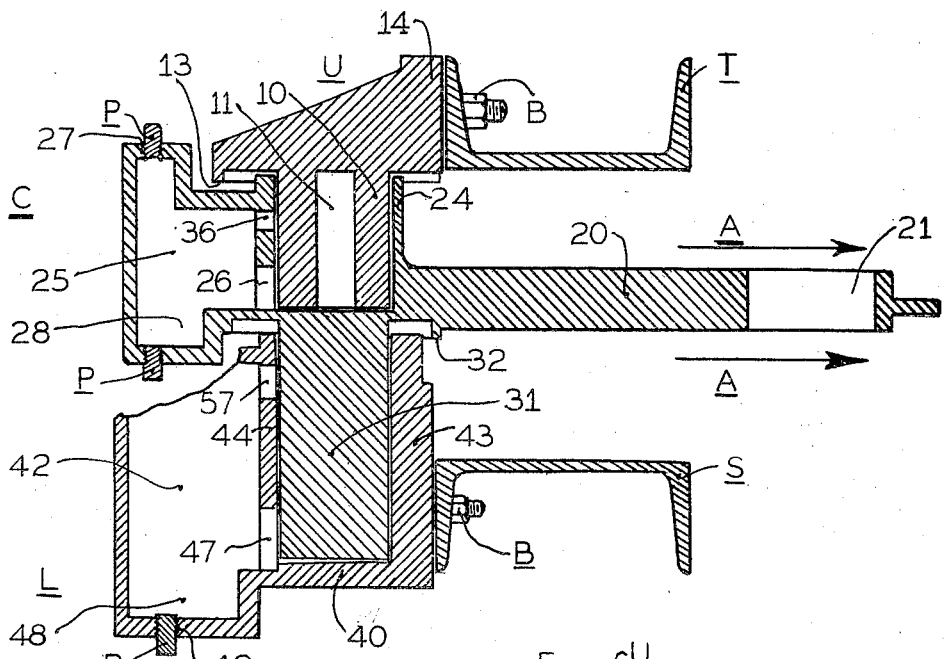
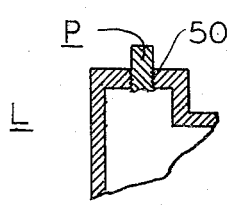
FIG. 11.
FIG. 10.
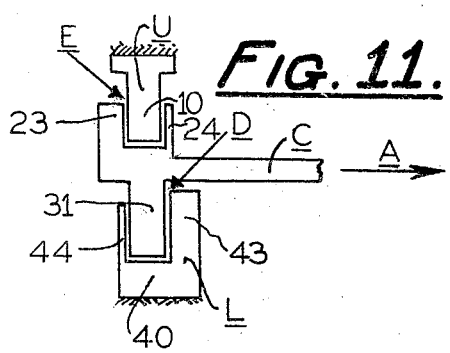
Inventor
BERT G. GOBLE.
By Tom B. Boman, Attorney Nov. 29, 1932.  B. G. GOBLE  1,889,243
SELF LUBRICATING VERTICAL BEARING WITH SETTLING BASIN
Filed Dec. 15, 1928    4 Sheets-Sheet 4

Inventor
BERT G. GOBLE.
By
Tom B. Boman.  Attorney

Patented Nov. 29, 1932

1,889,243

UNITED STATES PATENT OFFICE

BERT G. GOBLE, OF TULSA, OKLAHOMA, ASSIGNOR TO W. A. QUIGLEY

SELF LUBRICATING VERTICAL BEARING WITH SETTLING BASIN

Application filed December 15, 1928. Serial No. 326,264.

This invention has to do with the creation of a long lived bearing connection and more particularly pertains to the automatic oiling system adapted to forcibly clean and lubricate a vertical bearing.

Primarily this novel bearing structure is intended to replace what is commonly known as a "D-stirrup." D-stirrups, as the name implies, are bifurcated and pass around the member to be pulled or moved, and rest in a bearing thereon. No oiling system is provided and hence friction hinders and soon destroys such types of bearings. Furthermore, these stirrups are deficient in that no protection is afforded to the contacting surfaces from the ravages of the weather.

D-stirrups, or sometimes T-links, as disclosed in my application Serial Number 297,194, filed August 3, 1928, said links being designated by the numeral 30, operate in a vertical position and any oil which may be poured thereon quickly dissipates. Hence, it is almost impossible to keep them oiled and breakage is frequent as they sometimes operate under a strain of 15,000 pounds. The D-stirrup is commonly used throughout the oil fields for transmitting the pull of the shackle rod lines.

Now, in my improved bearing, I aim to obviate the above defects as well as generally improve the present structures.

One of the principal advantages in my T-shaped bearing is the fact that it is so constructed that both pins or journals oscillate in baths of oil. It will be noted that the bath of oil is the full size of the bearing and hence all moving parts will be adequately lubricated. This fact gives the bearing not only an easy action but is conducive to a long life of same.

Another advantage obtained is due to the location of the reservoirs. Both reservoirs are situated so as to permit a full oscillation of the pulling element and are placed at the desired height above the bearings themselves. Due to this latter feature when a surplus of oil is poured into a reservoir it overflows the bearing and flushes out any dirt which has accumulated therein.

The reservoirs are of such capacity as to provide the bearings with sufficient oil for months at a stretch and such is especially desirable when the bearings or links are used with swings such as set forth in applicant's copending application, Serial Number 297,194, filed August 3, 1928, as the locations of such swings are usually widely scattered over the oil lease and likely as not are in more or less inaccessible places.

The shape of the reservoirs is clearly shown in the drawings and it will be noted that any dirt, especially the worn off metal from the sliding parts will settle to the lower chamber shown. Hence, the plug may be removed from the bottom of this lowermost chamber or settling basin and all dirt flushed or washed out. This procedure is very seldom resorted to as ordinarily the flushing occasioned by the addition of surplus oil, as previously described, will be sufficient to keep the bearing in good shape.

It will be noted that although my lubricating reservoirs extend above the highest contacting or rubbing surfaces for the purpose of providing pressure to force the oil therebetween, nevertheless such reservoir spaces may be utilized by simply filling the reservoir entirely full of oil and then tightly inserting the upper plug. This creates a closed chamber and a vacuum forms as the oil is slowly used and this vacuum prevents the oil from quickly running out.

Still another advantage resides in the fact that I entirely enclose my bearing proper and its connecting oil chambers whereby practically all dirt is excluded. Also, I provide overhanging portions which protect the junctures between the three parts of my improved bearing. Thus, driving storms will not cause the bearing to get full of water and exclude the oil.

Yet another advantage is obtained by eccentric distribution of the metal surrounding the oscillating parts whereby a thick portion is provided at the point where most wear occurs. Obviously this is an economical feature.

My novel bearing is also a big improvement over the bearings now commonly used and some of which run in a bath of oil, as a rain fills the reservoir with water and floods the oil out thus feeding the moving surfaces with only a mixture of oil and water which affords no real lubrication.

Still further advantages and objects will definitely appear from the detailed description to follow.

I attain the above enumerated advantages by the structure set forth in the accompanying drawings, in which—

Fig. 1 is a side view showing the three main parts of my improved bearing in an exploded position.

Fig. 2 is a side view taken at right angles to the side view of Fig. 1, showing only the upper journal or pin with its flange for fastening same in place.

Fig. 3 shows a side view of the lower cup or bearing.

Fig. 4 is a top or plan view of the cup member shown in Fig. 3. This view particularly illustrates the eccentric positioning of the metal in the cup.

Fig. 5 is a view taken along the line 5—5 of Fig. 4 and shows a cross sectional view of the cup bearing and its reservoir without its plugs or stoppers.

Fig. 6 is a top or plan view of the T-member itself.

Fig. 7 is a sectional view of the T-member taken along the line 7—7 of Fig. 6.

Fig. 8 is a top view of the entire bearing assembly bolted in place upon two parallel supporting beams. The upper beam is partly broken away to expedite the showing.

Fig. 9 is a sectional view taken along the lines 9—9—9 of Fig. 8. The upper portion of Fig. 9 is taken along the upper line 9—9 of Fig. 8 and the lower left hand portion of Fig. 9 is taken along the lower line 9—9 of Fig. 8. Thus Fig. 9 portrays a central cross section of both lubricant chambers.

Fig. 10 shows the upper corner of the lower reservoir. This supplements the showing of Fig. 9.

Fig. 11 is a diagrammatic sketch illustrating the points where maximum wear occurs and showing how my eccentric positioning of the metal takes care of the unequal wear.

Fig. 12 is a view very similar to that set forth in Fig. 10 but differing by the addition of a riser or pipe whereby extra pressure may be obtained interiorly of the bearing.

Figure 13:
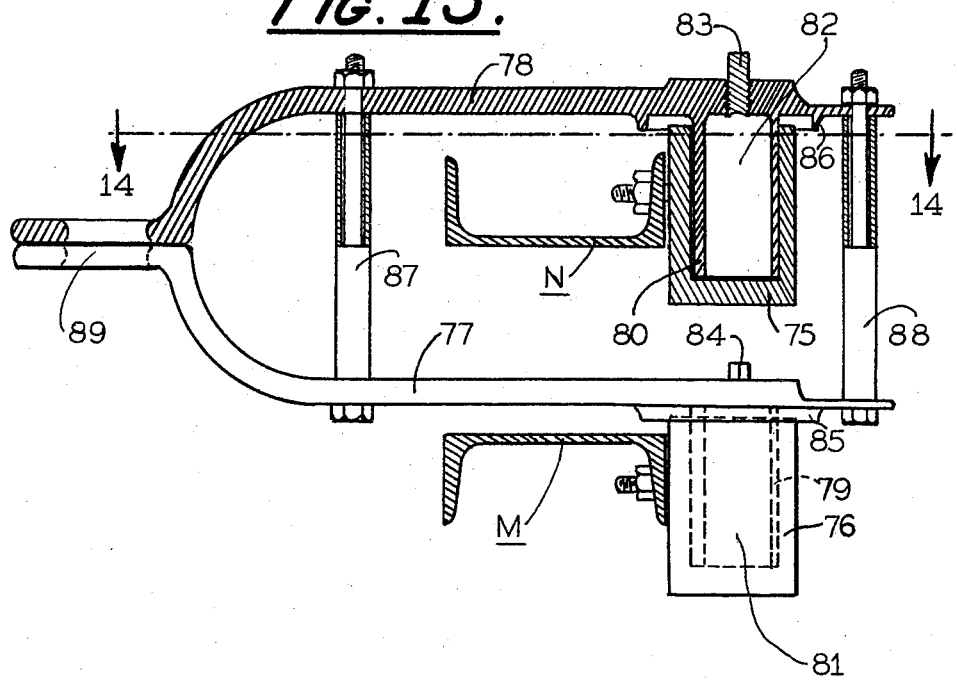
Figure 14:
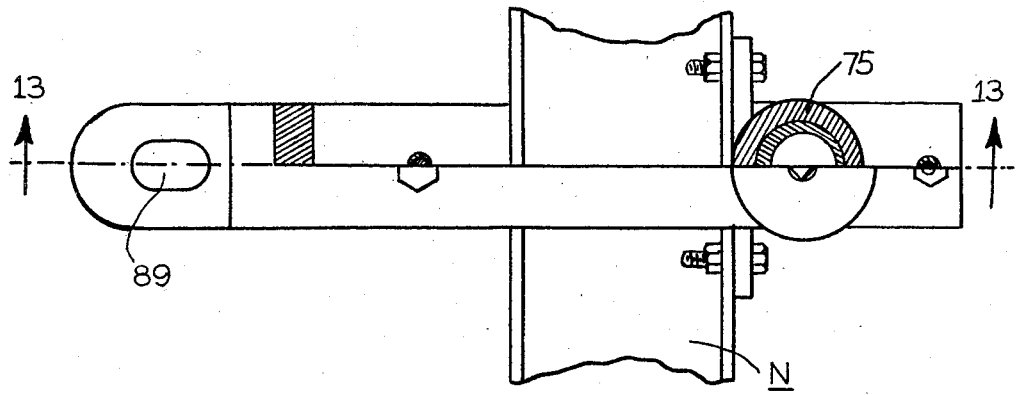

Fig. 13 is a view taken partly on the line 13—13 of Fig. 14. This view illustrates a modification in which both bearing cups are exactly the same shape.

Fig. 14 is a view taken partly on the line 14—14 of Fig. 13. This view is a top view of applicant's modification.

Similar numerals refer to similar parts throughout the several views.

As shown in Fig. 1 the T-shaped member, C, is centrally situated between the upper pin or journal, U, and the lower bearing or cup, L. The upper journal, U, is bolted to a supporting member, T, by means of bolts, B, and the lower cup bearing is bolted by bolts, B, to another supporting member, S. Plugs or stoppers, P, and risers, R, if desired, are used in the reservoir openings and complete the list of separate pieces making up my invention.

The separate features of each part or piece and its relationship to the others will now be taken up.

The upper journal, U, has a circular portion, 10, extending downwardly, and a hole, 11, see Figs. 1 and 2, materially adds to the capacity of the upper reservoir. A flange, 12, extends horizontally and overhangs the circular portion 10. A lip, 13, see Fig. 9, protects the joint between the members U and C.

A supporting flange, 14, having holes 15 and 16, provides means for holding the upper journal, U, to the supporting member, T, by means of the bolts, B. This is clearly shown in Fig. 9 wherein parallel channels serve as supporting members, T and S.

The T-shaped member, C, has a stem, 20, which is pulled by means attached in the hole, 21, in the direction of the arrows, A. Oppositely disposed to the hole 21 and directly under the circular portion, 10, see Fig. 1, is a cup shaped seat, 22. This seat forms a bearing for the upper journal, U, and has a thickened portion, 23, at one side and a thinner portion, 24, diametrically opposite. The purpose of this will be described later.

A reservoir chamber, 25, is formed integrally with the cup seat and openings, 26 and 36 interconnect the two. An upper hole, 27, is tapped into the top of the reservoir 25, and serves as an entrance for the lubricant. A plug, P, closes the hole to exclude dirt and water from the reservoir.

If necessary, a riser, R, see Fig. 12, may be inserted into the hole, 27, or the hole, 50, and lubricant poured therein. Thus, if the riser or pipe is 5 feet in length a pressure of over 2 pounds is obtained which is sufficient to forcibly expel any foreign matter which may have collected in the bearing.

The reservoir chamber, 25, has an enlarged part, 28, which is situated below the lowermost bearing surface. This part, 28, forms a sediment catcher wherein both dirt and water may collect. When desired, the plug, P, is withdrawn from the hole, 29, and the entire chamber thoroughly flushed out.

A circular portion, 31, similar to the portion, 10, extends downwardly from the stem, 20, and is in exact alignment with the cup bearing, 22. A lip, 32, is concentric and overhanging with respect to the portion, 31, and protects the joint between members, C and L.

This downwardly extending journal, 31, movably fits into a cup bearing, 40, integrally formed with a flange, 41, and a reservoir, 42. The cup bearing has a thickened part, 43, and a thinner portion, 44, for a purpose which will be described later.

Flange, 41, has holes, 45 and 46, through which bolts, B, extend to hold the entire lower cup bearing, L, to a supporting member, S, such as shown in Fig. 9.

Reservoir, 42, has interconnecting ducts or gates 47 and 57, to the cup bearing 40 and lubricant enters therethrough. A lower chamber, 48, provides a space for the sediment to collect and a hole 49, with a plug, P, furnishes means for flushing same. An upper hole, 50, may be provided with a plug, P, or a riser, R, as desired.

Fig. 11 presents an exaggerated showing of the several thickened portions of my structure. As will be noted when the central element, C, is pulled in the direction of the arrow, A, and oscillated, wear will occur principally at the points designated by the arrows E and D. Hence, I form my upper cup so that a thickened portion occurs at the tip of the arrow B, where it is needed. Likewise, I form a thickened portion at the arrow D where it is also needed.

Figs. 13 and 14 illustrate one of the many modifications which I consider to be within the purview of my invention.

Cup bearings, 75 and 76, identical in structure, are bolted by bolts, B, to the supports M and N respectively. Frame members, 77 and 78, have downwardly extending journals, 79 and 80, which are mounted respectively in cup bearings 75 and 76.

Cup bearing, 75, has a reservoir, 82, formed therein and a plug, 83, provides for the entrance of lubricant. Similarly, cup bearing, 76, has a hollowed out portion, 81, which is fitted with a plug or stopper, 84.

Frame members, 77 and 78, are respectively provided with circular lips 85 and 86 which shield the reservoirs against the entrance of water or foreign matter.

Bolts 87 and 88 firmly fasten the frame members together and a complementary hole, 89, furnishes a means for attaching the pulling element.

From the above description it will be apparent to those skilled in the art, and more particularly to those also skilled in oil field equipment, that I have produced a bearing which is capable of having both members of a T-shaped bearing rotating in a bath of oil thereby rendering it not only more efficient but longer efficient.

Therefore, without limiting myself to the particular embodiment of my invention illustrated and explained above, and desiring to protect my invention in the broadest manner legally possible, what I claim is:—

1. A bearing consisting of a stem, and a vertical positioned cup thereon, a juxtaposed journal fastened to the stem in exact aligned relationship to the cup, cup bearing means housing the journal, means for supporting same, reservoir means integrally formed with said cup bearing means and a duct interconnecting the two, additional reservoir means integrally formed with the first mentioned vertical positioned cup and a duct leading from said additional reservoir to the adjacent cup whereby the cup is kept filled with lubricant, and a pin snugly fitting in said last mentioned cup, and stationary means for supporting said pin.

2. A bearing comprised of a stem having a cup member formed integrally therewith, a juxtaposed journal member also formed integrally therewith, reservoir means interconnected with the cup member, a pin journalled in said cup member, another cup shaped bearing surrounding and enclosing the juxtaposed journal member, and supporting means for said pin and said last mentioned cup bearing.

3. A T-bearing consisting of a stem having a downwardly extending journal member and an upwardly extending cup member, means pivotally cooperating interiorly of the upwardly extending cup member, and a cup bearing surrounding the downwardly extending journal member and means for applying lubricant to said cup bearing and said cup member.

4. A bearing comprised of a stem, a cup member on its upper side, a journal member on its lower side, journal or pin means cooperatively engaging with said cup member and cup bearing means cooperatively engaging with said journal member.

In testimony whereof I affix my signature.

BERT G. GOBLE.